United States Patent [19]

Albano

[11] Patent Number: 4,941,630
[45] Date of Patent: Jul. 17, 1990

[54] ISOLATING PIPE STRAP FOR PLUMBING PIPES

[76] Inventor: Joseph A. Albano, 1595 Ridley St., Santa Rosa, Calif. 95401

[21] Appl. No.: 316,780

[22] Filed: Feb. 28, 1989

[51] Int. Cl.$^5$ .............................................. F16B 15/00
[52] U.S. Cl. ........................................ 248/71; 248/62; 248/743; 248/901
[58] Field of Search ................... 248/71, 74.1, 74.2, 248/74.3, 65, 62, 901; 24/90 B, 113 R

[56] References Cited

U.S. PATENT DOCUMENTS

| | | | |
|---|---|---|---|
| 792,594 | 6/1905 | Hiss, Jr. | 248/71 X |
| 2,291,148 | 7/1942 | Carson | 248/71 X |
| 2,319,832 | 5/1943 | Trochim | 248/71 X |
| 2,641,428 | 6/1953 | Kirk et al. | 248/71 X |
| 3,266,761 | 8/1966 | Walton et al. | 248/71 |
| 3,483,285 | 12/1969 | Foley | 248/71 X |
| 4,153,228 | 5/1979 | Delserro | 248/74.3 |
| 4,195,807 | 4/1980 | Llauge | 248/74.2 |
| 4,794,229 | 12/1988 | Goss et al. | 29/611 X |

Primary Examiner—Ramon O. Ramirez

[57] ABSTRACT

A U-shaped isolating pipe strap is provided with two support arms attached by a central bight section. The distal ends of the arms have ninety degree bends forming shanks. The ends of the shanks have sharpened points which serve as nails for driving into wooden framing members. The bight or curved end of the strap is coated with flexible dielectric insulation which prevents corrosion between two dissimilar metals. Affixed to the surface of the dielectric insulation is a tubular section of plastic which serves to isolate the pipe from the wooden framing preventing noise caused by vibration and the movement caused by natural lengthwise expansion and contraction of the pipe.

2 Claims, 4 Drawing Sheets

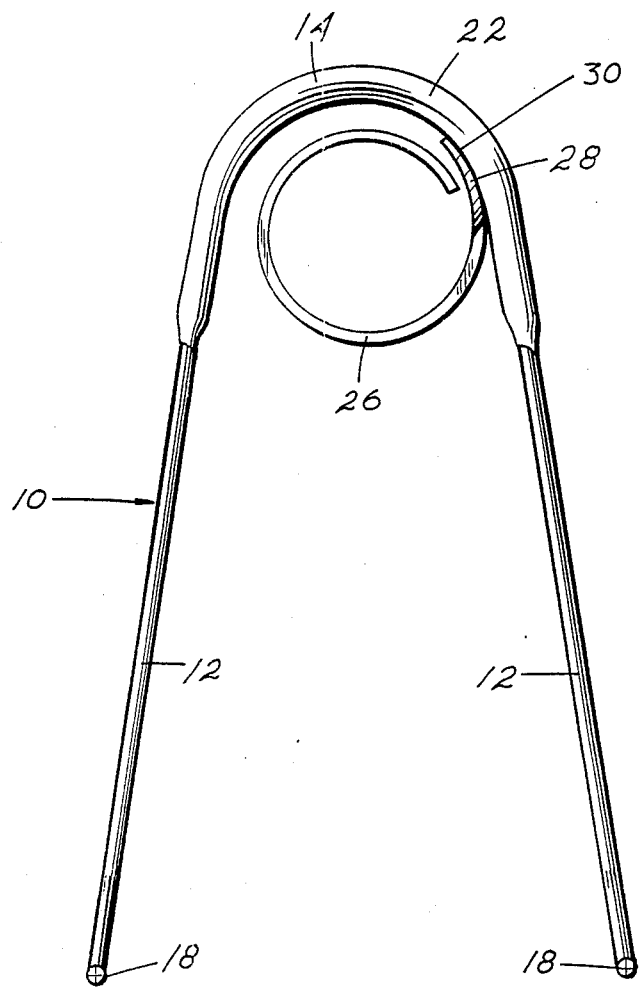
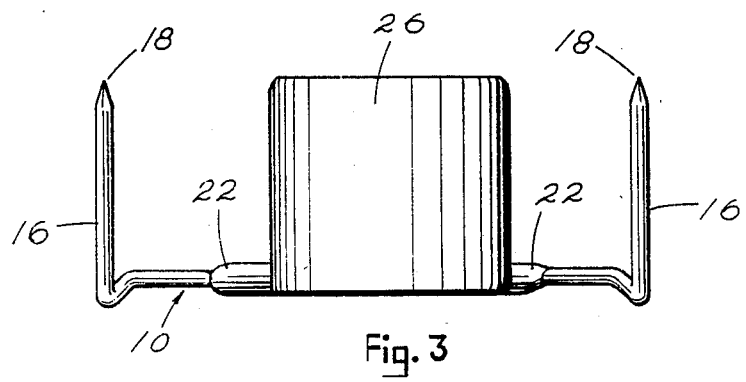

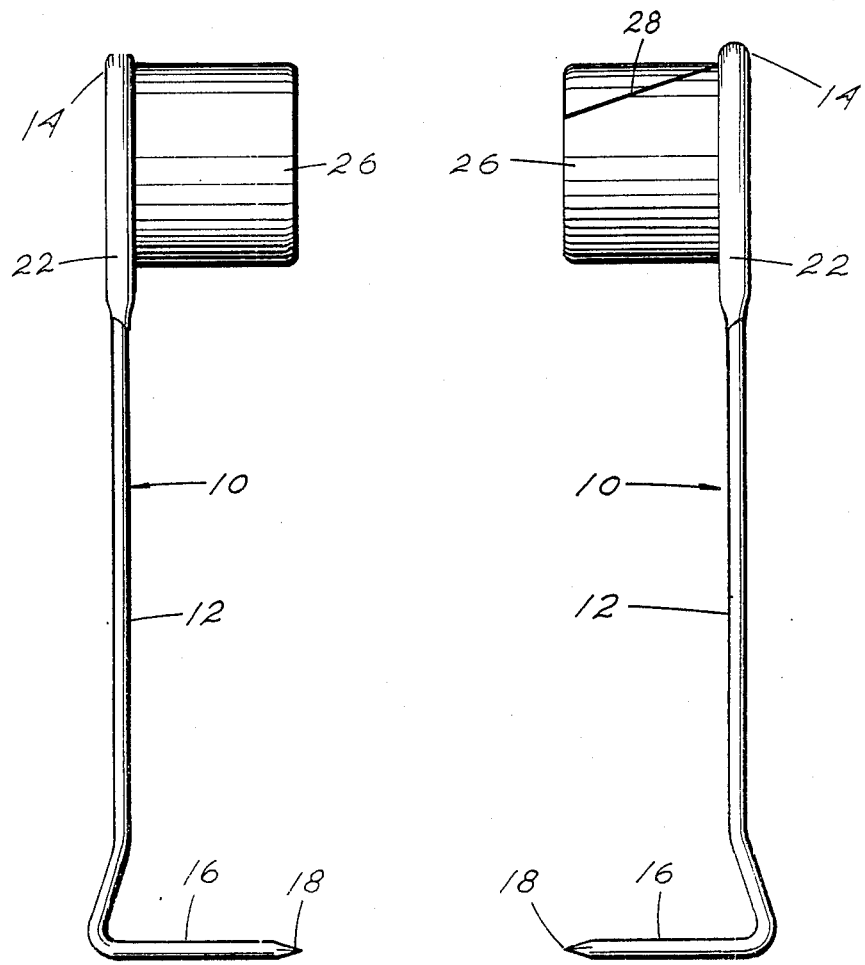
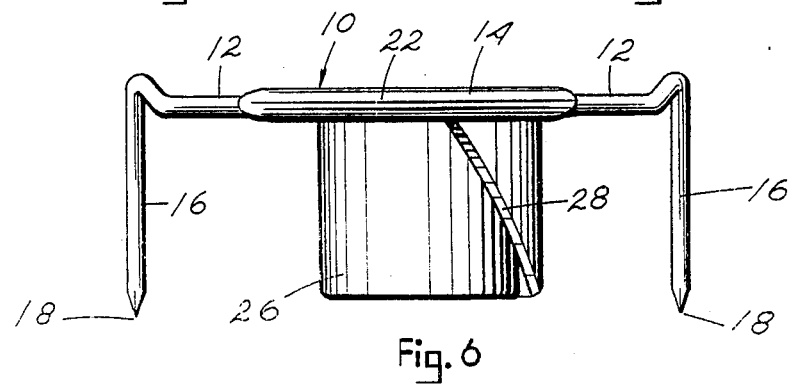

ISOLATING PIPE STRAP FOR PLUMBING PIPES

BACKGROUND OF THE INVENTION

1. Field of the Invention

This invention relates to securing devices for plumbing pipes and more precisely to strapping devices which both secure the pipe to a surface while maintaining a separation between the pipe and the mounting surface.

2. Description of the Prior Art

It has long been known in the plumbing industry that water pipes strapped against wooden studs and joists of buildings can create annoying noises which may be transferred into adjacent rooms. These noise problems are often so loud and obnoxious to the occupant that a repairman or plumber must be called to locate and resolve the problem. The exact location of the problem is quiet difficult to find and is usually not in an area which is readily accessible to repair once found.

One specific cause of noisy plumbing is the vibration or "hammering" of the pipes against the wood created by the flow of fluid and the shutting and opening of valves. This vibration problem only occurs while water is running and is caused by an insufficient number of straps or insufficient tightness of the strapping. The problem is avoidable with straps currently available on the market if they are installed correctly.

A second cause of noisy plumbing is the natural contraction and expansion of the pipes attributable to varying extremes of temperatures of the water. This unavoidable expansion and contraction of the pipes causes both the diameter and the length of the pipes to vary. It is the changing length of the piping which has been found to be a primary cause of noise problems. As the lengths of the pipes change with expansion and contraction, the pipes slide longitudinally through the pipe strap and against the wood to which the plumbing is strapped. The sliding of the plumbing against the wooden members can create a variety of noises ranging from sounding like a violin to a trombone or worse. Since the wooden framing members are normally supporting the ceiling or a wall of a building oppositely the side of the strapped plumbing, the sound of the sliding pipe is carried into the room through the wood.

The majority of pipe straps in use today are manufactured of steel due to the strength and rigidity of the metal. A large portion of plumbing pipes in the ½" to 1" diameter range used today are manufactured of a copper alloy which unfortunately reacts with the steel in the straps causing electrolysis between the two dissimilar metals. Modern plumbing installation procedures under such conditions employ some form of dielectric insulation between the pipe and metal strap to prevent electrolysis. Pipe straps and hangers which make this procedure simple and fast are currently commercially available on the market. There are however, several drawbacks to the available straps with regard to sound control.

One principal drawback is that some types of straps use insulation material which is provided as a separate unit from the strap. This is less convenient and more time consuming to install than a strap which comes complete with the insulating medium inherent to the device. Another drawback is that other straps use only a thin ring of insulating material over the metal which works well to separate the strap from the pipe, but does not separate the pipe from the wood framing member.

A past art patent search was conducted to examine dielectrically insulated pipe straps which also have means for maintaining a separation between the pipe and the mounting surface. Of the devices examined, the following appeared most pertinent to my invention:

A patent issued to E. J. Carson on July 28, 1942, U.S. Pat. No. 2,291,148, teaches a pipe hanger. The Carson pipe hanger uses a U-shaped metal hanger with a narrow ring of permanently attached insulation covering the metal at the closed end of the "U". In use, the Carson device would allow abutment of the pipe against the surface of the wooden stud due to the positioning of the insulation.

A patent issued to S. Delserro on May 8, 1979, U.S. Pat. No. 4,153,228, teaches a self-tightening clamp which requires attachment to the wood with separate nails or screws. The Delserro clamp requires the installer to locate appropriately sized nails or screws and then keep them within reach when applying the clamps to the pipe. This is generally inconvenient and adds time to the installation process. The Delserro device also appears that if the clamp was sufficiently flexible to be spread allowing installation of the clamp anywhere along a length of pipe his clamp would be inadequately rigid to prohibit vibrating or "hammering" noises since it attaches at only one location. If the Delserro clamp must be inserted over the end of the pipe, the installation of any significant length of pipe would prove to be an extremely tedious and time consuming job.

SUMMARY OF THE INVENTION

In practicing my invention, I overcome deficiencies seen in the past art by providing an insulated plumbing pipe strap in a single unit designed to isolate the metal of the strap from the metal of the pipe. In my device, a rod-like isolating pipe strap is rounded centrally forming a bight-like central section with two support arms angling back from the bight section. The terminal ends of the two arms have ninety degree bends formed into short shanks. The ends of the shanks have sharpened points which serve as nails for driving into wooden framing members. The bight or curved end of the strap is coated with a flexible dielectric insulation which prevents corrosion between two dissimilar metals. Affixed to the surface of the dielectric material is a tubular section of plastic which serves to isolate the pipe from the wooden framing preventing noise caused by vibration and the movement caused by natural lengthwise expansion and contraction of the pipe. A number of my pipe straps can securely fasten a pipe to a series of aligned framing members while at the same time maintain a separation between the pipe and the mounting surface and the pipe and the material of my pipe strap. With my device, a single sized strap accommodates a variety of pipe sizes.

The isolating pipe strap of the immediate invention works equally well with vertical studs or horizontal joists. The material of the support arms is also adequately pliable to allow adjustment of the arms and shanks into various positions, yet still strong enough to provide adequate support for the pipe. My device saves time over straps having separate insulation materials by incorporating all the necessary parts into one unit. No cutting of the insulation is necessary, nor are additional nails or screws necessary. No separate parts are needed which could become misplaced.

Therefore, it is a primary object of my invention to provide an isolating pipe strap which reduces or eliminates noise resulting from vibration of the pipes and from the scraping of the pipe against the wood during natural expansion and contraction.

A further object of my invention is provide an isolating pipe strap which comes in a complete unit, ready to use without assembly or additional parts.

A still further object of my invention is to provide an isolating pipe strap which prevents corrosion of the pipe due to galvanic action between two metals.

Other objects and advantages of my device will become apparent with a reading of the following specification and comparison of numbered parts described with similarly numbered parts illustrated in the accompanying drawings.

BRIEF DESCRIPTION OF THE DRAWINGS

FIG. 2 is a rear view thereof.
FIG. 3 is a bottom view thereof.
FIG. 4 is a right side view.
FIG. 5 is a left side view.
FIG. 6 is a top plan view.

DESCRIPTION OF THE PREFERRED EMBODIMENT

Figure 1:
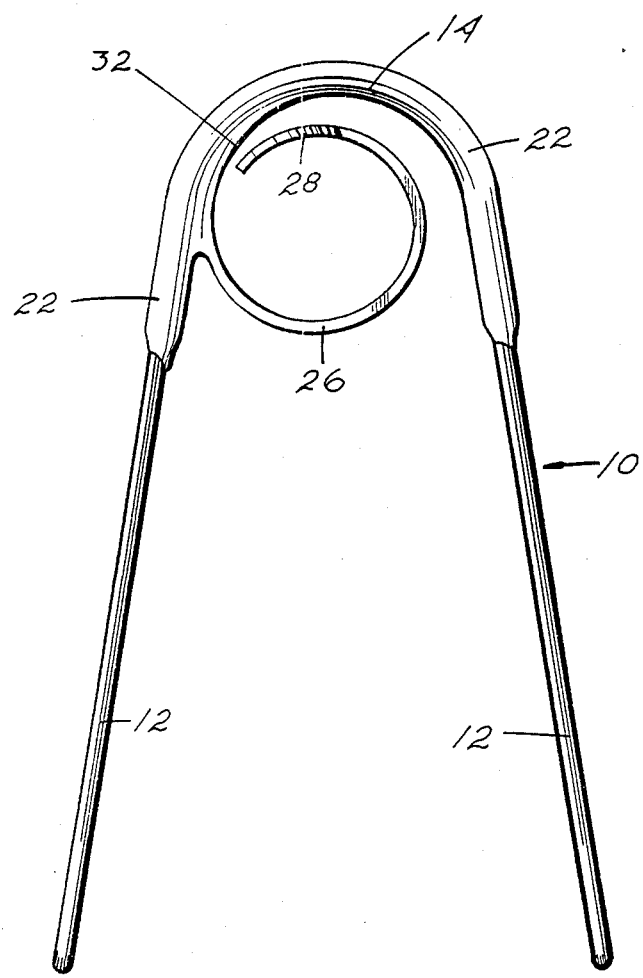
FIG. 1 is a frontal view of the pipe strap.

Referring now to the drawings and to FIG. 1 where the preferred embodiment of the isolating pipe strap 10 is shown in a frontal view. Isolating pipe strap 10 is comprised of a U-shaped section of metal wire having two elongated support arms 12 angling back from a central looping curve designated bight section 14. Both support arms 12 project outward substantially divergently from bight section 14, best seen in FIG. 1, all positioned in a common plane. The distal ends of each support arm 12 are bent approximately into right angles, forming short shanks 16, shown in FIGS. 3 to 6. Shanks 16 are positioned perpendicular to the common plane of supports arms 12 and bight section 14. The distal ends of both shanks 16 are inwardly beveled forming sharp shank points 18. Shanks 16 serve as the means for attaching isolating pipe strap 10 to wooden stud 20 or other similar support surface. Bight section 14 is entirely covered with a coating of dielectric insulation 22, shown in the drawings in all views, serving to prevent corrosion between a metal isolating pipe strap 10 and plumbing pipe 24. The dielectric insulation 22 currently used in my device is comprised of a liquid plastic coated over the metal and hardened into a resilient but durable surface. Affixed to the interior concave surface of bight section 14, onto dielectric insulation 22, is pipe insulation 26, seen in all views of the drawings. Pipe insulation 26 is comprised of a short section of plastic cylindrical tubing separated by diagonal cut 28. Pipe insulation 26 is structured of resilient material and affixed as an inner loop inside the outer loop, bight section 14, attached by a portion to dielectric insulation 22. The attachment can be by weld, or by adhesives as shown in FIG. 2 where dielectric insulation 22 affixed to pipe insulation 26 forms a two piece insulation unit 30. Dielectric insulation 22 and pipe insulation 26 can also be manufactured as a single unit shown in FIG. 1 and designated as one piece insulation unit 32. Pipe insulation 26 projects from bight section 14 in the same direction as shanks 16 with the lengthwise side in parallel alignment with shanks 16. Diagonal cut 28 is positioned adjacent the interior curve of bight section 14 and attachment of pipe insulation 26 is made to the surface of dielectric insulation 22 by one end adjacent diagonal cut 28.

In use, support arms 12 are positioned over pipe 24 while separating the free end of pipe insulation 26 sufficiently to insert pipe 24 into the interior of pipe insulation 26. When released, pipe insulation 26 returns to the original tubular shape and conforms to the outer diameter of pipe 24. This eliminates the need of the person installing the device to wrap the insulation over the pipe and retain it in that position until the strap is secured. Diagonal cut 28 can remain slightly agape and pipe 24 will still be protected from galvanic action due to the presence of dielectric insulation 22. The two ends of pipe insulation 26 adjacent diagonal cut 28 can overlap without any adverse affect. With support arms 12 now projecting outward perpendicular from pipe 24, pipe 24 is abutted against wooden stud 20, or a floor joist. Support arms 12 project past the abutment of pipe 24 and wooden stud 20 and are positioned parallel to the side of wooden stud 20. Shanks 16 are now driven into wooden stud 20 with a hammer in a fashion similar to driving nails.

Although I have primarily described isolating pipe strap 10 as being metal, it is anticipated that isolating pipe strap 10 may be manufactured of plastic in the future should sufficiently strong plastics be developed which are adequate for the fabrication of isolating pipe strap 10. At the present time, the cost of plastic fabrication is somewhat prohibitive.

As suggested earlier, pipe insulation 26 can overlap itself without adversely altering the effectiveness of the device. Therefore, it is anticipated that dielectric insulation 22 can be eliminated entirely and replaced with a longer section of pipe insulation 26. This new section of pipe insulation 26 must be larger in diameter than the pipe 24 it covers so that overlapping occurs. This system would prove cost effective by eliminating a step in the manufacturing process of the device. However, greater care in installing the device would be required to ensure that overlapping does indeed occur.

Isolating pipe strap 10 can also be adapted to support any size pipe 24 and be affixed to virtually any material including rock, concrete or metal framing.

Figure 7:
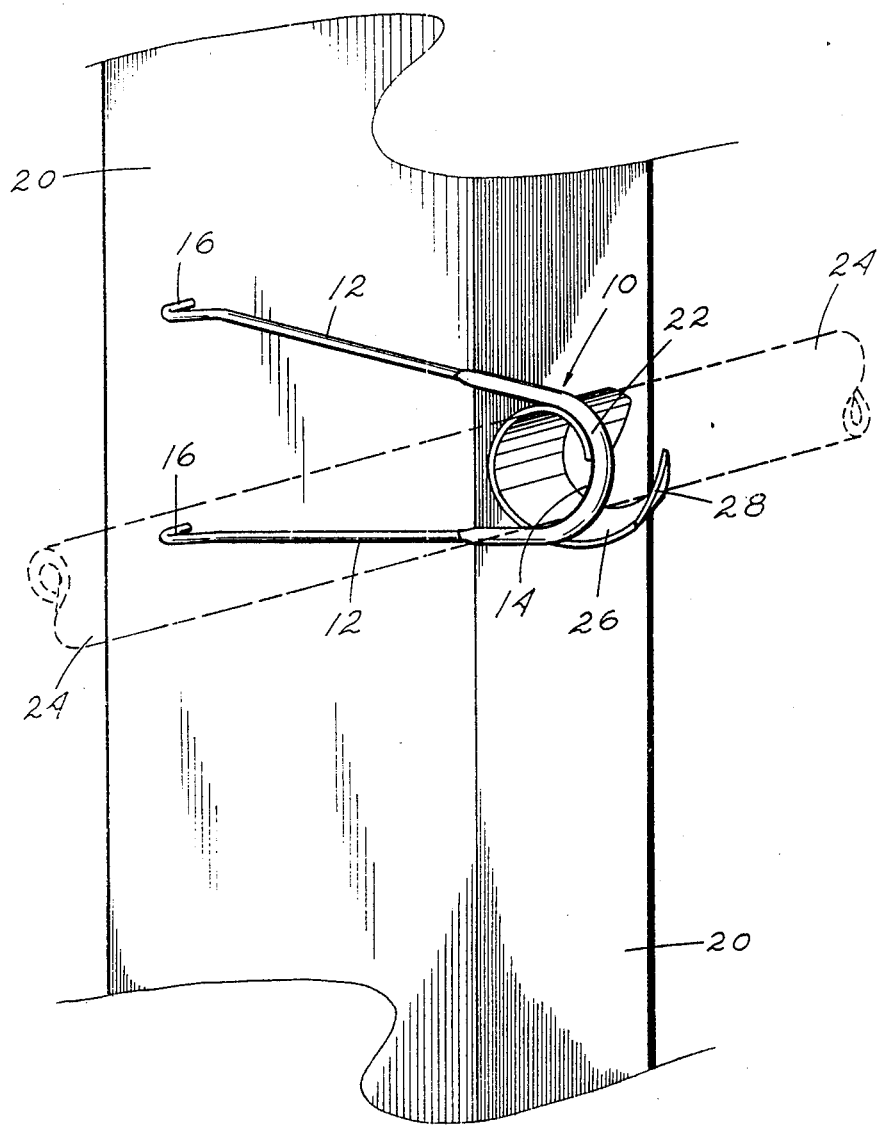
FIG. 7 is a perspective in use view illustrating the pipe strap attached to a wooden stud. The dotted outline represents a plumbing pipe.

Two methods of manufacturing the finished isolating pipe straps 10 are illustrated in the drawings. FIG. 1 shows injection molded one piece insulation unit 32. The encasement of bight 14 by dielectric insulation 22 is accomplished by injection molding. Using this method, dielectric insulation 22 and pipe insulation 26 are formed in one piece of the same insulating plastic material. Injection molding is also the method for manufacturing the device when the entire structure is fabricated of plastic. FIG. 2 is illustrative of the method where isolating pipe strap 10 is manufactured as a one-piece continuous rod. In this method, a single curve bend is made centrally at bight section 14 and the two support arms 12 angle back equally in length from bight section 14. The distal ends of support arms 12 are right angled into shanks 16 with the ends sharpened into shank points 18. Dielectric insulation 22 is applied at bight section 14 by dipping or by sliding the insulating material on and heat shrinking. Tubular formed pipe insulation 26 is adhered as an inside loop to dielectric insulation 22. Diagonal cut 28 opens freeing an end so pipe insulation 26 can be wrapped around a plumbing pipe 24 as shown in FIG. 7. The angle of diagonal cut 28 is immaterial and could just as well be a straight cut. In this application, a metal such as steel is the preferred material of manufacture.

Although I have described my invention in detail in the specification, it is to be understood that modifications in the structure and design of the device may be practiced insofar as such changes remain within the scope of the appended claims.

What I claim as my invention is:

1. An isolating pipe strap, comprising
two substantially divergent rod-like support arms continuously connected centrally at a bight section;
said support arms angling outward from said bight section in a common plane;
said support arms having distal ends bent at substantially right angles into parallelling short sharpened shanks;
said sharpened shanks being means for attachment of said strap to a support surface;
said bight section forming an outer loop and having said outer loop encased in dielectric insulation;
said bight section affixed with pipe insulation;
said pipe insulation being an elongated cylindrical section of resilient material affixed as an inner loop in said bight section attached by a portion thereof to said dielectric insulation;
said pipe insulation having a cut therethrough providing a separation of said cylindrical section allowing an overlapping of the pipe insulation over a pipe.

2. An isolating pipe strap, comprising
two substantially divergent rod-like support arms continuously connected centrally at a bight section;
said support arms angling outward from said bight section in a common plane;
said support arms having distal ends bent at substantially right angles into parallelling short sharpened shanks;
said sharpened shanks being means for attachment of said strap to a support surface;
said bight section forming an outer loop and having said outer loop encased in dielectric insulation;
said bight section affixed with pipe insulation as a molded part of said dielectric insulation;
said pipe insulation being an elongated cylindrical section of resilient material affixed as an inner loop in said bight section attached by a portion thereof as a continuing part of said dielectric insulation;
said pipe insulation having a cut therethrough providing a separation of said cylindrical section allowing an overlap of the pipe insulation over a pipe.

* * * * *